United States Patent
Choi (10) Patent No.: US 8,729,753 B2
(45) Date of Patent: May 20, 2014

(54) STATOR ASSEMBLY FOR MOTOR AND MOTOR INCLUDING THE SAME

(75) Inventor: Tae Young Choi, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 58 days.

(21) Appl. No.: 13/373,389

(22) Filed: Nov. 14, 2011

(65) Prior Publication Data

US 2013/0033147 A1 Feb. 7, 2013

(30) Foreign Application Priority Data

Aug. 2, 2011 (KR) ........................ 10-2011-0077000

(51) Int. Cl.
*H02K 7/00* (2006.01)
(52) U.S. Cl.
USPC .......................................... 310/67 R; 310/425
(58) Field of Classification Search
USPC ................... 310/67 R, 216.113, 425
See application file for complete search history.

(56) References Cited

U.S. PATENT DOCUMENTS

| | | | | |
|---|---|---|---|---|
| 5,497,040 A | * | 3/1996 | Sato ............................ | 310/67 R |
| 5,844,748 A | * | 12/1998 | Dunfield et al. ........... | 360/99.08 |
| 2002/0003678 A1 | | 1/2002 | Sakuragi et al. | |
| 2002/0080711 A1 | | 6/2002 | Han | |
| 2005/0104464 A1 | | 5/2005 | Fujii et al. | |
| 2005/0135003 A1 | | 6/2005 | Inoue et al. | |
| 2005/0140220 A1 | | 6/2005 | Tsuda et al. | |
| 2005/0243461 A1 | | 11/2005 | Kitamura et al. | |
| 2005/0270693 A1 | | 12/2005 | Rehm et al. | |
| 2007/0171569 A1 | | 7/2007 | Burns et al. | |
| 2007/0274002 A1 | | 11/2007 | Kim et al. | |
| 2010/0053807 A1 | | 3/2010 | LeBlanc et al. | |
| 2011/0150677 A1 | * | 6/2011 | Ida et al. .................... | 417/423.7 |

FOREIGN PATENT DOCUMENTS

| | | |
|---|---|---|
| JP | 8-255445 | 10/1996 |
| JP | 2000-134880 | 5/2000 |
| JP | 2003-259596 | 9/2003 |
| JP | 2011-67084 | 3/2011 |
| KR | 10-0168619 | 4/1999 |
| KR | 10-2008-0097293 | 11/2008 |
| WO | 90/13167 | 11/1990 |

OTHER PUBLICATIONS

Korean Office Action issued Sep. 20, 2012 in corresponding Korean Patent Application No. 10-2011-0077000.
U.S. Office Action issued Oct. 24, 2013 in corresponding U.S. Appl. No. 13/564,290.
U.S. Office Action issued Mar. 3, 2014 in corresponding U.S. Appl. No. 13/564,290.

* cited by examiner

*Primary Examiner* — Dang Le (57) ABSTRACT

There is provided a stator assembly for a motor including: a base for a motor fabricated with a steel sheet; a core installation part installed on the base for a motor; and a stator core fixed to the core installation part, wherein the core installation part includes a guide portion guiding an insertion of the stator core and a mounting portion on which the stator core is mounted.

8 Claims, 6 Drawing Sheets

STATOR ASSEMBLY FOR MOTOR AND MOTOR INCLUDING THE SAME

CROSS-REFERENCE TO RELATED APPLICATIONS

This application claims the priority of Korean Patent Application No. 10-2011-0077000 filed on Aug. 2, 2011, in the Korean Intellectual Property Office, the disclosure of which is incorporated herein by reference.

BACKGROUND OF THE INVENTION

1. Field of the Invention

The present invention relates to a stator assembly for a motor and a motor including the same, and more particularly, to a stator assembly for a motor having an improved coupling structure of a stator core and a base and molded by press working, and a motor including the same.

2. Description of the Related Art

A hard disk drive (HDD), an information storage device for a computer, is a device for reading data stored on a disk or writing data to a disk by using a magnetic head.

In the HDD, a head driving unit, i.e., a head stack assembly (HAS), is installed on a base such that a magnetic head may move across a disk. By the head driving unit, the magnetic head may perform its function while moving to a desired position, in a state of being separated from a recording face of the disk by a certain height.

In the related art, in manufacturing a base provided in the HDD, the base is manufactured through a post-processing method of removing burrs, or the like, generated through die-casting after die-casting aluminum (Al).

However, since a die-casting method according to the related art includes a process of injecting aluminum (Al) in a molten state and performing shaping, the die-casting method requires high temperatures and high pressures, resulting in a requirement for a large amount of energy and lengthening a processing time.

Also, in terms of a die-casting mold life span, there is a limitation in manufacturing a large number of bases with a single mold, and bases manufactured by the die-casting method may have defective dimensional accuracy.

Thus, in order to solve the problems of the die-casting method, bases are manufactured through pressing or forging, however bases manufactured through pressing or forging basically have a uniform thickness, causing defects in coupling a core thereto.

Namely, when there is a significant difference in size between an outer diameter of a sleeve and an inner diameter of a core, there are limitations infirmly connecting the sleeve, the core, and the base. In this case, the structure of at least one of the components is required to be improved to allow them to be connected.

Thus, when bases are manufactured through press working, research into stably connecting a base, a sleeve, and a core to thereby maximize performance and life span thereof is urgent.

SUMMARY OF THE INVENTION

An aspect of the present invention provides a stator assembly for a motor, capable of firmly coupling a base and a stator core around which a coil is wound in the case of manufacturing the base by press working, and at the same time, preventing a degradation in the coupling force of the base and the stator core according to temperature to thereby maximize performance and life span thereof, and a motor including the same.

According to an aspect of the present invention, there is provided a stator assembly for a motor, the stator assembly including: a base for a motor molded by press working; a core installation part installed on the base for a motor; and a stator core fixed to the core installation part, wherein the core installation part includes a guide portion guiding an insertion of the stator core and a mounting portion on which the stator core is mounted.

The base for a motor may have a fixing portion protruded upwardly in an axial direction to fix the core installation part, and the core installation part is coupled to an outer circumferential face of the fixing portion.

The base for a motor may have a fixing portion protruded upwardly in an axial direction to fix the core installation part, and the core installation part may be coupled to an inner circumferential face of the fixing portion, and the stator core is mounted on an upper face of the fixing portion.

The mounting portion may be formed by forming a step portion on an outer circumferential face of the core installation part.

The mounting portion may be protruded to an outer radial direction from an outer circumferential face of the core installation part.

The mounting portion may be continuously or discontinuously formed in a circumferential direction along the outer circumferential face of the core installation part.

The core installation part may be made of a material the same as that of the base for a motor.

According to another aspect of the present invention, there is provided a motor including: the stator assembly for a motor; a sleeve coupled to the base for a motor and supporting a shaft; and a hub rotating together with the shaft and having a magnet coupled thereto, the magnet generating rotational driving force according to interaction with a coil.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, and those are to be construed as being included in the spirit of the present invention.

Further, throughout the drawings, the same or similar reference numerals will be used to designate the same or like components having the same functions in the scope of the similar idea.

Figure 1:
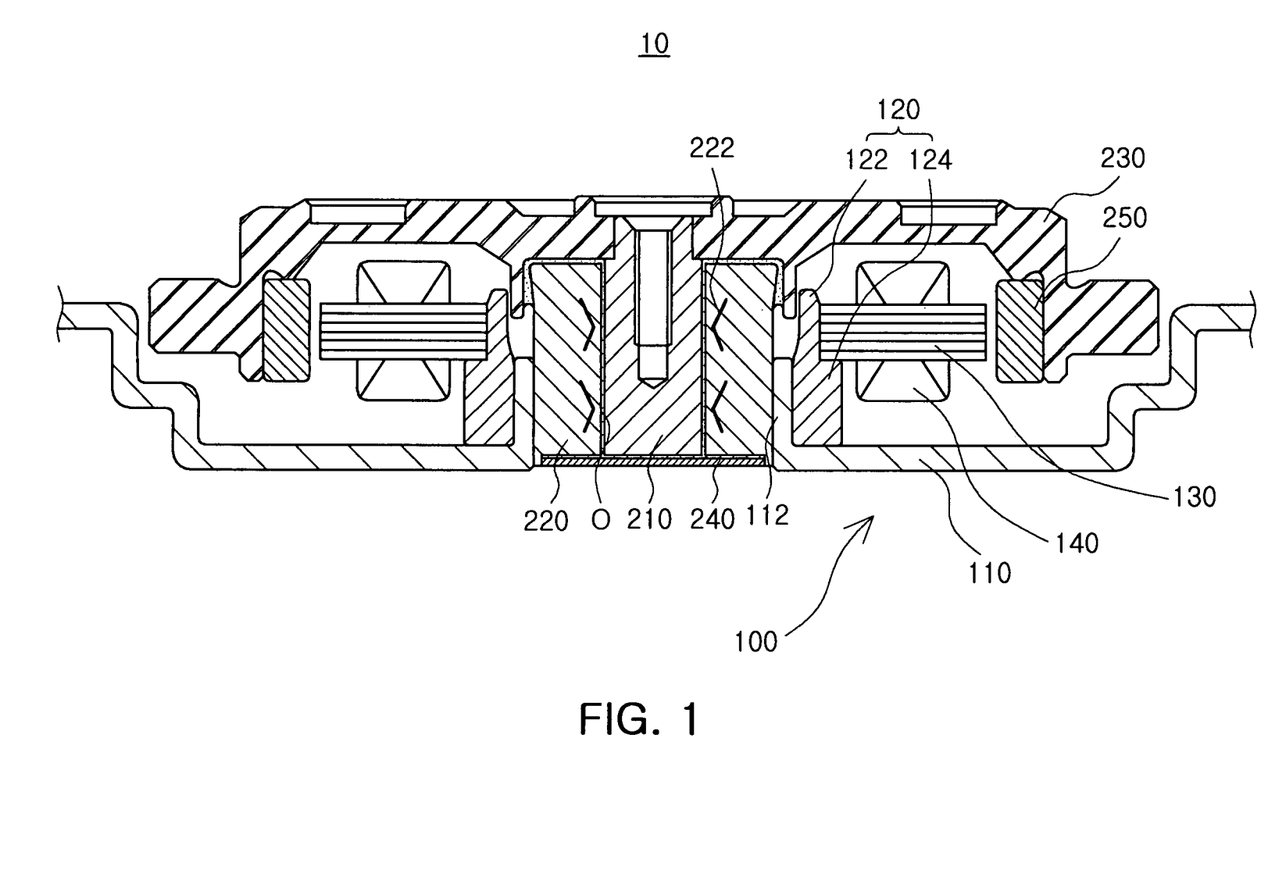
FIG. 1 is a schematic cross-sectional view of a motor including a stator assembly for a motor according to an embodiment of the present invention.
Figure 2:
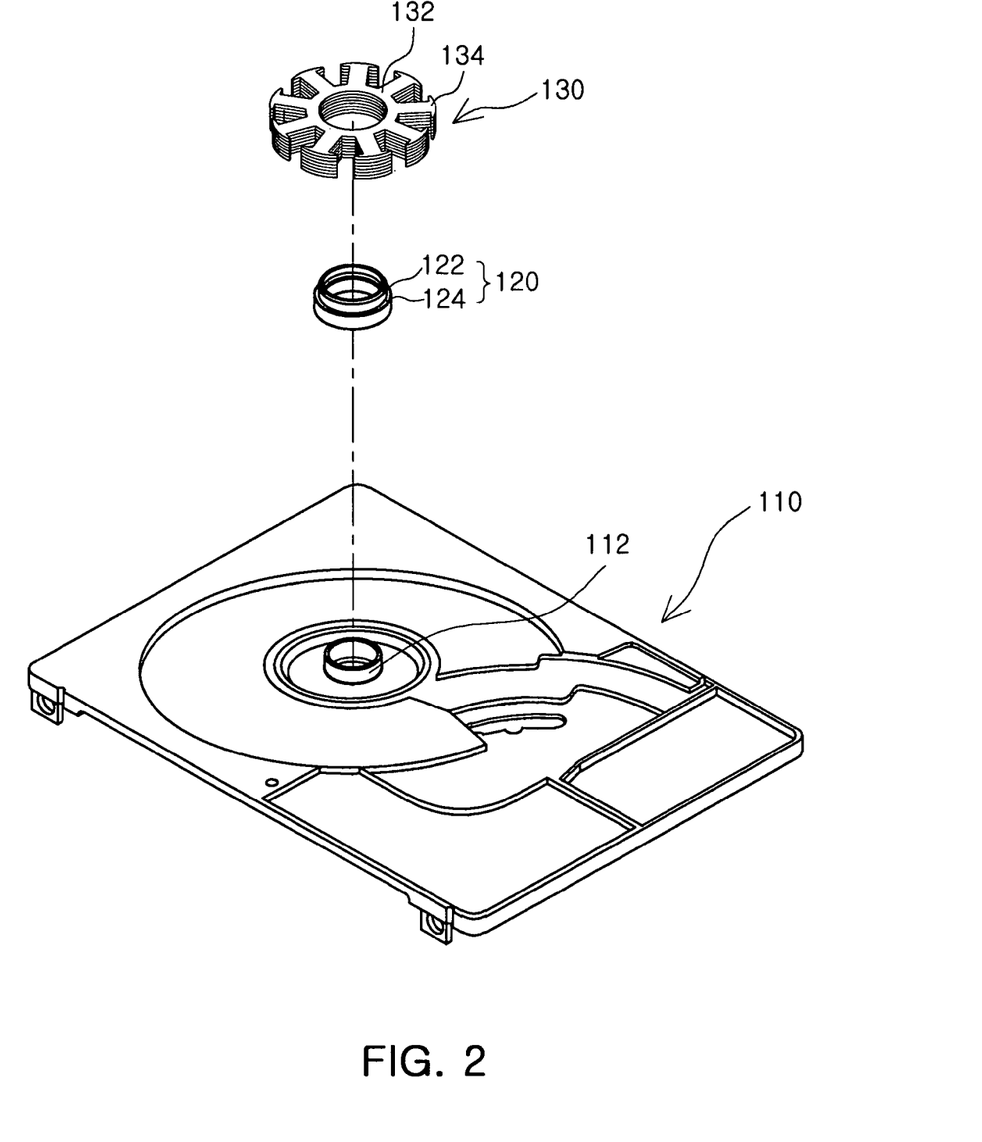
FIG. 2 is a schematic exploded perspective view of the stator assembly for a motor according to an embodiment of the present invention.
Figure 3:
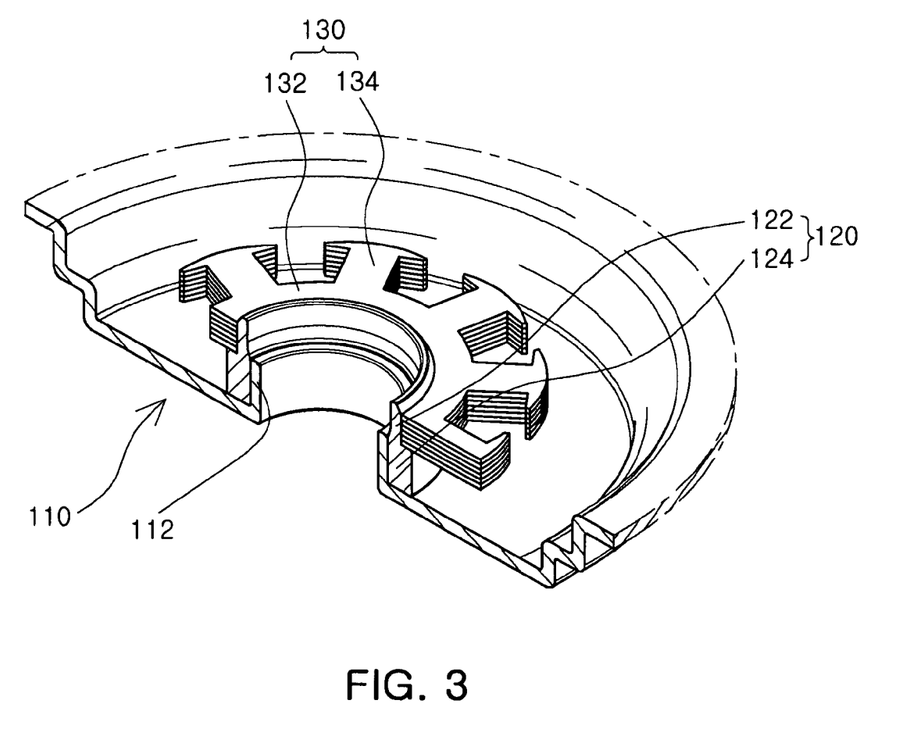
FIG. 3 is a schematic cutaway perspective view of the stator assembly for a motor according to an embodiment of the present invention.

FIG. 1 is a schematic cross-sectional view of a motor including a stator assembly for a motor according to an embodiment of the present invention. FIG. 2 is a schematic exploded perspective view of the stator assembly for a motor according to an embodiment of the present invention. FIG. 3 is a schematic cutaway perspective view of the stator assembly for a motor according to an embodiment of the present invention.

With reference to FIGS. 1 through 3, a motor 10 according to an embodiment of the present invention may include a stator assembly 100 for a motor (hereinafter referred to as a 'stator assembly'), a sleeve 220 supporting a shaft 210, and a hub 230 which rotates together with the shaft 210.

First, terms regarding directions will be defined. An axial direction refers to a vertical direction based on the shaft 210 when viewed in FIG. 1, an outer radial direction and an inner radial direction refers to a direction towards an outer edge of the hub 230 based on the shaft 210 or a central direction of the shaft 210 based on the outer edge of the hub 230.

Also, a circumferential direction may be a direction in which the shaft 210 rotates along an outer circumferential face of the shaft 210.

The stator assembly 100 may include a base 110 for a motor (hereinafter, referred to as a 'base'), a core installation part 120 and a stator core 130.

Here, the base 110 may be a stationary member which is coupled to the sleeve 220 supporting the shaft 210, a shaft system of the motor 10, according to an embodiment of the present invention, to support a rotation of the hub 230 and the shaft 210, rotation members.

As for the base 110, a plate member such as a cold rolled carbon steel sheet (SPCC, SPCE, or the like), a hot rolled carbon steel sheet, or the like, is subjected to press working to fabricate a basic configuration of the base 110, and then subjected to post-processing such as bending, cutting, or the like, to thereby produce an overall shape of the base 110.

Here, a mold used in press working may be formed to have a shape corresponding to the shape of a final product of the base 110, whereby the base 110 may be manufacture through a single process.

Here, the base 110 may have a fixing portion 112 formed to be protruded upwardly in the axial direction such that the sleeve 220 and the core installation part 120 may be fixed thereto. The sleeve 220 may be insertedly coupled to an internal space of the fixing portion 112.

Here, the base 110 and the sleeve 220 may be coupled through at least one of a bonding method, a welding method, and a press-in method.

Also, the fixing portion 112 of the base 110 may indirectly support the stator core 130 by the core installation part 120, the stator core 130 having a coil 140 wound therearound.

The core installation part 120 may be installed between the stator core 130 and the fixing portion 112 of the base 110 in order to couple the stator core 130, around which the coil 140 is wound, and the fixing portion 112 of the base 110.

In other words, the core installation part 120 may be coupled to an outer circumferential face of the fixing portion 112, having a uniform diameter to allow the stator core 130 to be insertedly mounted thereon.

Namely, the core installation part 120 may include a guide portion 122 guiding an insertion of the stator core 130 and a mounting portion 124 on which the stator core 130 is mounted.

Here, an inner circumferential face of the guide portion 122 may be coupled to the outer circumferential face of the fixing portion 112 of the base 110 through at least one of a press-in method, a bonding method, and a welding method, and the core installation part 120 and the stator core 130 may be coupled in the same manner.

Also, the diameter of an upper outer circumferential face of the guide portion 122 may be reduced upwardly in the axial direction, and accordingly, the guide portion 122 may effectively guide an insertion of the stator core 130.

The core installation part 120 may be separately manufactured as an installation member facilitating coupling of the stator core 130 and the fixing portion 112 of the base 110 having a uniform thickness in terms of the characteristics of the manufacturing technique, i.e., the press working, of the base 110 according to an embodiment of the present invention, to be coupled to the fixing portion 112.

In other words, in a case in which there is a significant difference in size between the outer diameter of the sleeve 220 and the inner diameter of the stator core 130, coupling g the sleeve 220 and the stator core 130 to the fixing portion 112 of the base 110 having a uniform thickness may be difficult. This limitation may be solved through the separately manufactured core installation part 120.

In detail, as previously mentioned, the core installation part 120 may have the guide portion 122 and the mounting portion 124, and the mounting portion 124 may be formed by forming a step portion on the outer circumferential face of the core installation part 120.

The mounting portion 124 may be formed to continuously extend in the circumferential direction along the outer circumferential face of the core installation part 120.

In addition, the mounting portion 124 may continuously extend downwardly in the axial direction, such that a lower face of the mounting portion 124 may be coupled to an upper face of the base 110.

Further, the core installation part 120 may be made of the same material as that of the base 110, whereby a reduction in the coupling force of the base 110 and the core installation part 120 according to a change in temperature may be restrained.

Namely, the core installation part 120 and the base 110 may be made of a steel-based material, i.e., a plate member such as a cold rolled carbon steel sheet (SPCC, SPCE, or the like), a hot rolled carbon steel sheet, or the like, and as a result, the core installation part 120 and the base 110 may have the same thermal expansion coefficient.

Accordingly, although the base 110 and the core installation part 120 are expanded or contracted at high temperatures or low temperatures, the coupling force of the fixing portion 112 of the base 110 and the core installation part 120 may be uniformly maintained.

Namely, even when a thermal impact is applied to the base 110 and the core installation part 120, the coupling force of the base 110 and the core installation part 120 may be uniformly maintained.

However, the core installation part 120 and the base 110 may not be necessarily made of the same material. Namely, materials of the core installation part 120 and the base 110 may be variably modified, so long as the coupling force of the fixing portion 112 of the base 110 and the core installation part 120 may be uniformly maintained even in the case that the base 110 and the core installation part 120 are expanded or contracted at high or low temperatures.

The stator core 130 may be fixed to the core installation part 120 and may include an annular core back 132 and a plurality of teeth portions 134 extending in the outer radial direction from the core back 132.

The coil 140 may be wound around the teeth portions 134 a plurality of times.

Here, the core back 132 may be inserted into the guide portion 122 of the core installation part 120. A lower face of the core back 132 may be mounted on the mounting portion 124 of the core installation part 120, whereby the stator core 130 may be stably fixed on the core installation part 120.

The shaft 210, a rotation member coupled to the hub 230 and rotating together with the hub 230, may be supported by the sleeve 220.

Here, the sleeve 220 may support the shaft 210 such that an upper end of the shaft 210 is protruded upwardly in the axial direction. The sleeve 220 may be formed by forging copper (Cu) or aluminum (Al) or by sintering a copper-iron (Cu)-(Fe)-based alloy powder or an SUS-based powder.

The shaft 210 may be inserted into the sleeve 220 so as to have a micro clearance with a shaft hole of the sleeve 220. The micro clearance is filled with oil (O), and a rotation of the hub 230 may be more smoothly supported by a hydrodynamic part 222 formed on at least one of the outer circumferential face of the shaft 210 and an inner circumferential face of the sleeve 220.

The hydrodynamic part 222 may form pressure such that the shaft 210 is biased towards one side during the rotating thereof, and may have any one shape of a herringbone shape, a spiral shape, and a conchoid shape.

However, the shape of the hydrodynamic part 222 is not limited to the foregoing shapes, and the hydrodynamic part 222 may have any shape so long as it can generate hydrodynamic pressure for the rotation member including the shaft 210 and the hub 230 when the rotation member rotates, and there is no limitation in the number of required hydrodynamic parts.

Here, a base cover 240 may be coupled to the sleeve 220 downwardly in the axial direction while a clearance is maintained therebetween and oil (O) is accommodated in the clearance.

The base cover 240 may accommodate the oil (O) in the clearance between the base cover 240 and the sleeve 220, and the oil (O) may serve, by itself, as a bearing supporting the lower face of the shaft 210.

Also, the oil (O) is continuously filled in the clearance between the shaft 210 and the shaft hole of the sleeve 220, a clearance between the hub 230 and the sleeve 220, a clearance between the base cover 240 and the shaft 210 and the clearance between the base cover 240 and the sleeve 220, thereby forming a full-fill structure overall.

The hub 230 is a rotation structure which is rotatably provided with respect to the stationary member including the base 110. The hub 230 may have an annular magnet 250 formed on an inner circumferential face thereof, the annular magnet 250 corresponding to the stator core 130 while having a certain space therebetween.

Here, rotational driving force of the motor 10 according to an embodiment of the present invention may be obtained by an electromagnetic interaction between the magnet 250 and the coil 140 wound around the core 130.

Figure 4:
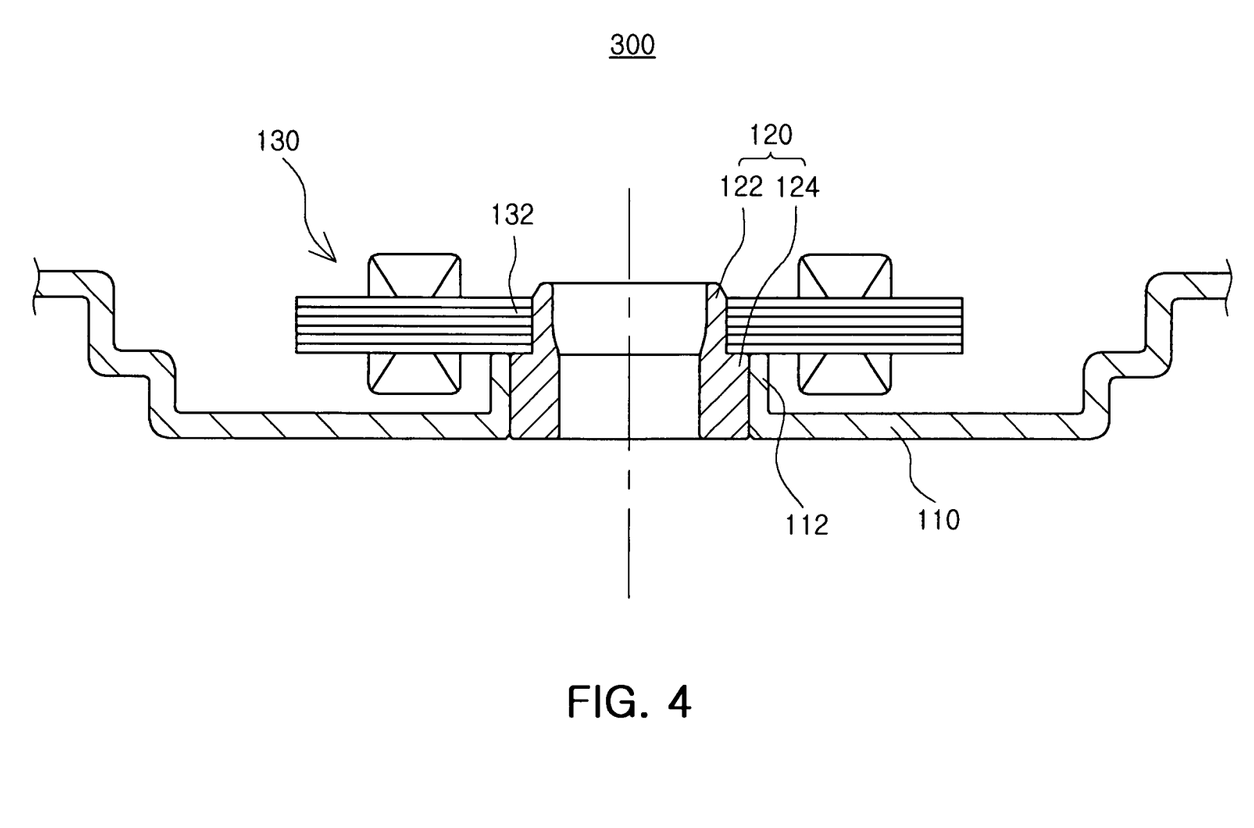
FIG. 4 is a schematic cross-sectional view of a stator assembly for a motor according to another embodiment of the present invention.

FIG. 4 is a schematic cross-sectional view of a stator assembly for a motor according to another embodiment of the present invention.

With reference to FIG. 4, a stator assembly 300 for a motor according to another embodiment of the present invention is the same as the stator assembly 100 for a motor according to the foregoing embodiment of the present invention, except for a disposition of the core installation part 120, so therefore a description of portions other than the disposition of the core installation part 120 will be omitted.

The core installation part 120 may be coupled to the inner circumferential face of the fixing portion 112 of the base 110. In detail, the outer circumferential face of the mounting portion 124 of the core installation part 120 and the inner circumferential face of the fixing portion 112 may be coupled through at least one of a bonding method, a welding method, and a press-in method.

Also, an upper face of the mounting portion 124 and an upper face of the fixing portion 112 may be coplanar, and accordingly, the lower face of the core back 132 of the stator core 130 may be simultaneously mounted on the upper face of the mounting portion 124 and the upper face of the fixing portion 112.

In addition, as the core installation part 120 is coupled to the inner circumferential face of the fixing portion 112 of the base 110, the sleeve 220 may be coupled to an inner circumferential face of the core installation part 120 through at least one of bonding, welding, and a press-in method.

Figure 5:
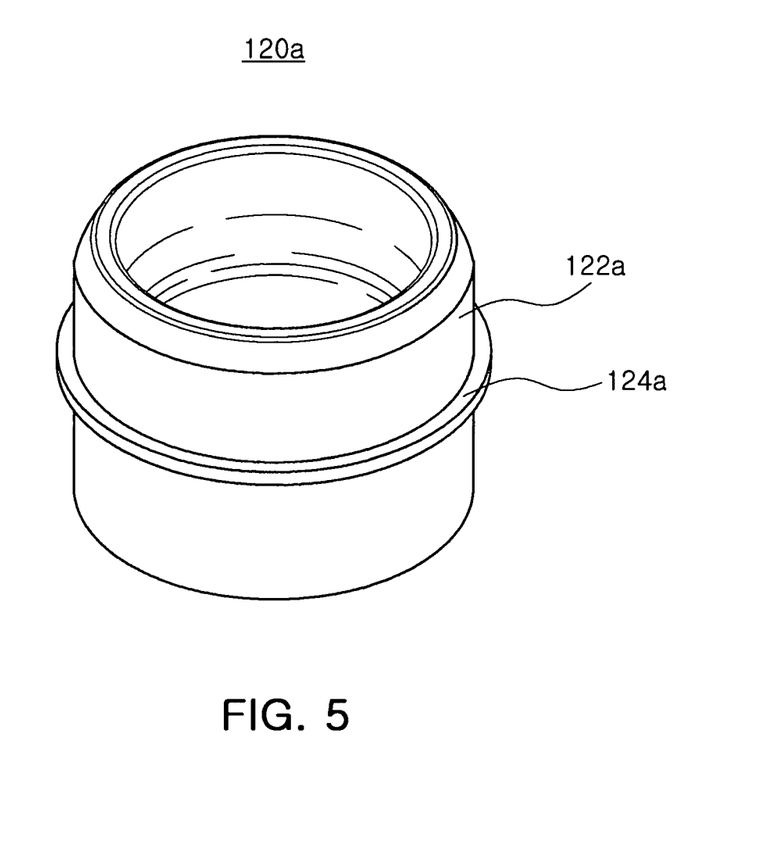
FIG. 5 is a schematic perspective view showing a modified example of a core installation portion provided at the stator assembly for a motor according to the present invention.
Figure 6:
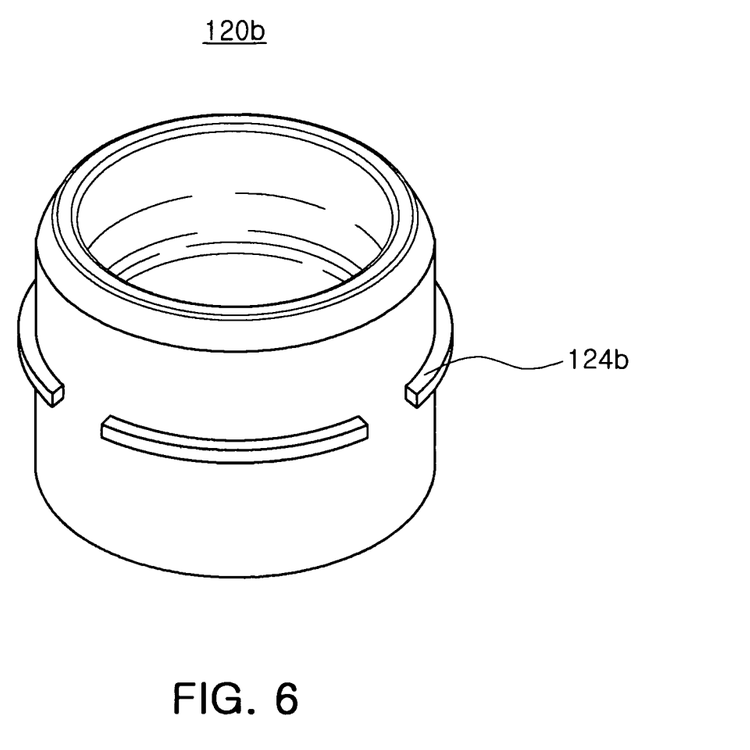
FIG. 6 is a schematic perspective view showing a modified example of a core installation portion provided at the stator assembly for a motor according to the present invention.

FIG. 5 is a schematic perspective view showing a modified example of a core installation portion provided at the stator assembly for a motor according to the present invention. FIG. 6 is a schematic perspective view showing a modified example of a core installation portion provided at the stator assembly for a motor according to the present invention.

With reference to FIG. 5, a core installation part 120a may include a guide portion 122a guiding an insertion of the stator core 130 and a mounting portion 124a on which the stator core 130 is mounted.

The mounting portion 124a may have a shape of a projection which is protruded in the outer radial direction from an outer circumferential face of the core installation part 120a, and may be continuously formed in the circumferential direction along the outer circumferential face of the core installation part 120a.

Here, the width of the mounting portion 124a in the axial direction is not limited, and the width of the mounting portion 124a may be freely changed within a range in which the mounting portion 124a is capable of supporting the stator core 130.

With reference to FIG. 6, mounting portions 124b of a core installation part 120b may be discontinuously formed in the circumferential direction along an outer circumferential face of the core installation part 120b.

Here, the mounting portions 124b may be symmetrically formed based on an axial center thereof so as to stably support the stator core 130.

Here, the number of the mounting portions 124b which are formed to be spaced apart from each other may not be limited but may be changed according to the intention of a person having ordinary skill in the art.

As set forth above, in the stator assemblies 100 and 300 for a motor, and the motor 10 including the same according to the embodiments of the invention, when the base 110 is manufactured through press working, the base 110 and the stator core 130, around which the coil 140 is wound, can be firmly coupled by the core installation parts 120, 120*a*, and 120*b*.

Also, degradation in the coupling force of the base 110 and the stator core 130 according to temperature can be prevented, whereby performance and life span can be maximized.

While the present invention has been shown and described in connection with the embodiments, it will be apparent to those skilled in the art that modifications and variations can be made without departing from the spirit and scope of the invention as defined by the appended claims.

What is claimed is:

1. A motor, comprising:
    a shaft;
    a sleeve rotatably supporting the shaft by hydrodynamic pressure;
    a base fabricated with a steel sheet;
    a core installation part fixed with respect to the base; and
    a stator core fixed to the core installation part,
    wherein the core installation part includes a mounting portion which is protruded to an outer radial direction from at least part of an outer circumferential face of the core installation part to form a support surface to retain the stator core in an axial position,
    wherein the stator core is fixed to the mounting portion and an outer circumferential face of the core installation part where the mounting portion is not formed,
    wherein the base has a fixing portion protruded upwardly in an axial direction, and the core installation part is fixed to an inner circumferential face of the fixing portion,
    wherein the sleeve is coupled to an inner circumferential face of the core installation part, and
    wherein a hydrodynamic part is formed on at least one of the outer circumferential face of the shaft and an inner circumferential face of the sleeve.

2. The motor of claim 1, wherein the stator core is positioned above the fixing portion.

3. The motor of claim 2, wherein the stator core is supported by the fixing portion.

4. The motor of claim 1, wherein the mounting portion is formed by forming a step portion on an outer circumferential face of the core installation part.

5. The motor of claim 1, wherein the mounting portion is continuously or discontinuously formed in a circumferential direction along the outer circumferential face of the core installation part.

6. The motor of claim 1, wherein the core installation part is made of a material the same as that of the base for a motor.

7. The motor of claim 1, further comprising:
    a hub rotating together with the shaft and having a magnet coupled thereto, the magnet generating rotational driving force according to interaction with the stator core.

8. The motor of claim 1, wherein the stator core is supported by the fixing portion.

* * * * *